United States Patent [19]

Yamato et al.

[11] 4,218,504

[45] Aug. 19, 1980

[54] HEAT-SENSITIVE RECORDING PAPER

[75] Inventors: Noboru Yamato; Tosimi Satake, both of Tokyo, Japan

[73] Assignee: Jujo Paper Co. Ltd., Tokyo, Japan

[21] Appl. No.: 973,635

[22] Filed: Dec. 27, 1978

[30] Foreign Application Priority Data

Dec. 28, 1977 [JP] Japan ................................ 52-158264

[51] Int. Cl.[2] .......................... B41M 5/18; B32B 5/16

[52] U.S. Cl. .................................... 428/207; 428/206; 428/211; 428/913; 430/338; 430/345; 106/21

[58] Field of Search ............... 428/270, 913, 206, 207, 428/211; 430/338, 345; 106/21, 288; 282/27.5

[56] References Cited

U.S. PATENT DOCUMENTS

| | | | |
|---|---|---|---|
| 3,185,584 | 5/1965 | Baumann et al. | 428/913 |
| 3,223,546 | 12/1965 | Hemstock | 106/288 |
| 3,825,427 | 7/1974 | Inoue et al. | 430/340 |
| 4,097,288 | 6/1978 | Lawton | 430/338 |

FOREIGN PATENT DOCUMENTS

| | | | |
|---|---|---|---|
| 835302 | 2/1970 | Canada | 430/338 |

*Primary Examiner*—Won H. Louie, Jr.

*Attorney, Agent, or Firm*—Stevens, Davis, Miller & Mosher

[57] ABSTRACT

A heat-sensitive recording paper containing in its color-developing layer calcined clay or calcined aluminum oxide provides an excellent recording aptitude for a facsimile equipment or thermal printer without producing residues deposition, sticking, bleeding or smearing in recording or printing.

6 Claims, No Drawings

HEAT-SENSITIVE RECORDING PAPER

BACKGROUND OF THE INVENTION

The present invention relates to heat-sensitive recording papers and more particularly, to such heat-sensitive recording papers having a well-improved recording aptitude for use in various heat-sensitive recording equipment including thermal printers, thermal recording type facsimile equipment or the like that can be obtained by adding calcined clay or calcined aluminum oxide into the color-developing layer of heat-sensitive recording papers.

Such heat-sensitive recording papers that utilize a heat color-developing reaction occurring between a colorless chromogenic dyestuff having a lactone, lactam, spiropyrane or the like structure and a phenol are disclosed in, for example, the Japanese Patent Publications No. 43-4160 and 45-14039 and the Japanese Laid-Open Patent Application No. 48-27736 and are now widely commercialized.

These heat-sensitive recording papers are produced by applying on the paper surface the coating prepared by individually grinding and dispersing a colorless chromogenic dyestuff and phenol into fine particles, mixing the resultant particles with each other and then adding thereto a binder, filler, sensitizer, slipping agent and other auxiliaries. When subjected to heat, the coating undergoe a chemical reaction which instantaneously develops a color, and various colors can be developed in clear shade depending upon the specific colorless chromogenic dyestuff selected.

These heat-sensitive recording papers has now been finding a wide range of applications, including medical or industrial recording instruments, terminals of electronic computer and date communication systems, printers of electronic desk calculators, facsimile equipment, automatic ticket vending machines and so on.

These recording equipment has a heating element such as a thermal head or heating pen (stylus) and the heat-sensitive recording paper, when contacted with such an heating element, is heated thereby to develop a color for recording.

Thermal heads that have been produced so far are diverse in their materials used and configuration. Accordingly, since the requirements for heat-sensitive recording papers vary largely with the performance, controlling method and recording conditions (applicable voltage, pulse width, temperature, pressure, recording speed and contents of date to be recorded) of the specific thermal heads used, the matching scheme between the respective heat-sensitive recording papers and the latter is very important. Especially in recent years, as the applications of recording equipment tend to be diversified and call for a higher performance, a higher quality has come to be required for heat-sensitive recording papers to be used thereon.

Ordinarily, a thermal head is subjected to its heating and cooling cycles repeatedly at a short cyclic period of 0.5–20 milliseconds, and the color-developing layer of a heat-sensitive recording paper contacted with the thermal head receives heat energy generated by the latter to cause a color-developing reaction for recording purpose.

As a matter of course, the heat-sensitive recording paper must have a sufficient color-developing sensitivity for producing clear colored records with such a small heat imput from the thermal head. As the thermal head is heated and cooled repeatedly in the recording process, heat-sensitive materials contained in the color-developing layer of the heat-sensitive recording paper is once melted and then set repeatedly. In this course, a portion of the heat-sensitive materials may stick to the head surface and, consequently, the melted heat-sensitive materials may be accumulated on the head surface as residues. If this occures, such accumulated residues will obstructs the conduction of heat from the head to heat-sensitive recording paper to render printed images obscure and, sometimes, to such an extent that the records are hardly readable. Also, if the heat-sensitive paper adhers or sticks to the thermal head causing a so-called "sticking", the movement of the paper or head will be obstructed with generation of offensive sounds and, in the worst case, the recording function itself may become impossible.

Further, as the heat-sensitive materials deposited on the thermal head may be retransferred to the heat-sensitive paper surface, the thermal head may not be cooled sufficiently in the cooling cycle succeeding to the printing cycle due to the accumulation of the heat-sensitive material or an increase in the ambient temperature of the head may heat any portions of the heat-sensitive paper other than those required for intended printed images to cause undesired coloring thereat, the print image may be degraded with such phenomena as bleeding, smearing or ghost resulting therefrom.

To minimize such recording troubles as mentioned above and to improve recording aptitude of heat-sensitive papers, various additions are generally added to the coating to be applied on the color-developing layer of the heat-sensitive papers in addition to a chromogenic dyestuff, phenolic substance and binder constituting its basic ingredients.

For example, with a view to improving the color-developing sensitivity, preventing adhesion of the heat-sensitive materials onto the head and preventing a frictional pollution, such waxes as paraffin waxes, polyolefin waxes, fatty amides including their methylol derivatives, higher fatty acids and their metal salts, condensates of a higher fatty acid and amine, polyhydric alcohol esters of higher fatty acids, higher alcohols and so on are added to heat-sensitive coating formulations. Also, for improving the coating aptitude, whiteness and brightness or preventing adhesion of residues onto the thermal head, clays such as china clay, kaolin, talc, titanium oxide, calcium carbonate, magnesium carbonate, zinc oxide, starch and other fillers are used.

To meet the requirements for the heat-sensitive recording equipment such as thermal type printers and facsimile equipment showing a tendency towards a higher performance and speed, the aforementioned waxes must be added in large quantities. However, as the amount of such heat-meltable waxes is increased, occurence of troubles such as accumulation of residues on the thermal head bleeding, smearing or ghost can also be increased. In order to effectively prevent such troubles, clays and other fillers must be added in larger quantities to keep the color-producing agents (colorless chromogenic dyestuff and phenolic substance) dispersed in a separated state and to cause the color-developing agents and waxes heat-melted in recording to be absorbed by the fillers and stabilized therein in as much as possible. However, increasing the content of such fillers that do not directly contribute to the color-developing reaction will result in a decrease in the developed color density and an increase in the amount of coating to be applied. In this sense, it has been very difficult to prevent substantially perfecty the accumulation of residues and other troubles while securing an optimum developed color density.

SUMMARY OF THE INVENTION

The inventors have successfully developed a heat-sensitive recording paper which has a well-improved recording aptitude permitting clear image printing and in which the possibility of residues accumulation and sticking is minimized, by using calcined clay or calcined aluminium oxide as a filler of the heat-sensitive coating.

In general, mineral clays are dehydrated when heated and undergo a chemical reaction such as decrystallization. These mineral clays are dehydrated in two modes. That is to say, their absorbed water and interlaminer water are removed at relatively lower temperatures (about 300° C. or below), while water bonded to their atomic configuration in the form of OH group, namely water of crystablization, is removed at higher temperatures (400° C.-1000° C.).

In most mineral clays, if their water of crystallization is removed by calcination, their atomic configuration undergoes a change into a metastable phase. This fact has been ascertained on kaolin mineral. That is to say, the kaolin was turned into metakaolin which was amorphous when viewed through X-ray diffractonetry.

When calcined at 500°-1000° C., a mineral clay is turned into an amorphous clay mineral having different physical properties from those of the original meneral clay before being calcined.

In the meantime, if aluminum hydroxide [$Al(OH)_3$] is heated, it is dehydrated and begins to release water at about 150° C. or above to be turned into aluminum oxyhydroxide [AlO(OH)] and, at about 300°-450° C., it suddenly loses water to be turned into γ-alumina ($Al_2O_3$) having a low crystallinity. When heated at 1000° C. or above, it undergoes a transition into α-alumina ($Al_2O_3$) showing the most stable state. The inventor have found that calcined clays and calcined aluminum oxide can be used as excellent fillers of heat-sensitive coatings. The present invention has been achieved on the basis of the aforementioned findings by the inventors.

DETAILED DESCRIPTION OF THE PREFERRED EMBODIMENTS

First, calcined mineral clays and aluminum hydroxide are amorphous in its nature and has an appropriately porous microstructure. Also, they show an oil absorption number higher than other ordinary clays. For the purpose of comparison, oil absorptions of some filling materials measured in accordance with JIS K 5101 are listed herein below;

| | |
|---|---|
| Kaolin clay (Kaobrite) | 46 ml/100g |
| Calcined Kaolin clay (Ansilex) | 120 ml/100g |
| Aluminum hydroxide | 51 ml/100g |
| Calcined aluminum oxide (calcined at 100° C.) | 94 ml/100g |
| Calcium carbonate (light calcium carbonate) | 45 ml/100g |

By adding calcined clay or calcined aluminum oxide having an adequate porosity and oil absorption as shown herein-above, it is possible to produce heat-sensitive recording papers having such very advantageous features from a viewpoint of practical usage there of as listed herein-below, in which with a lower mixing ratio of such a calcined material than that used in the prior art clays chromogenic dissolved substances can be absorbed efficiently and instantaneously in the paper surface and retained therein during and after the heat-recording and, therefore, transfer of heat-metable substances to the thermal head can be substantially prevented.

1. Improved image density and improved print image
2. Elimination of recording troubles due to deposited or accumulated residues
3. Reduction in paper stickiness due to melted chromogenic substances
4. Improved light-resistance of recorded image
5. Decrease in coatings to be coated on paper
6. Improved production efficiency The calcined clay to be used according to the present invention may be kaolinite, montmorillonite or haloicite that is heated and calcined at 500°-1000° C. Alternatively, such products that are commercially available under brand names "ANSILEX" and "SATINTONE #2" owned by Engelhard Minerals and Chemicals Corporation or "BURGESS #30" owned by Burgess Pigment Co., Ltd. may be used as well.

These calcined clays or calcined aluminum oxides may be used as a filler singly or in combination, or calcium carbonate, kaolin clay or synthetic aluminum silicate may be mixed therewith in a suitable amount in accordance with the specific application and intended performance. However, in all cases, it is necessary to add at least 5% by weight and, preferably, 10-30% by weight of calcined clay or calcined aluminum oxide per total filler.

Normally colorless or thin-colored chromogenic dyestuffs usable according to the present invention include: crystal violet lactone (blue), 3-diethylamino-6-methyl-7-chlorofluorane (vermilion), 3-cyclohexylamino-6-chlorofluorane (yellowish orange), 3-diethylamino-7-dibenzilaminofluorane (green), 3-diethylamino-6-methyl-7-anilinofluorane (black), 3-pyrrolidino-6-methyl-7-anilinofluorine (black). Phenolic substances usable according to the present invention include: bisphenol A (4,4-isopropylidene diphenol), p-p' (1-methyl-n-hexylidene) diphenol, p-tert-butyl phenol, p-phenylphenol, phenolic novolac resins.

These chromophoric dyestuffs, phenolic substances and other additives are dispersed in a solvent to obtain a paint. Thus, a suitable binder is required to apply the coating onto the surface of a substrate such as of paper or film. As the binder, the following substances may be used; polyvinyl alcohol, methyl cellulose, hydroxyethyl cellulose, acacia gum, carboxymethylcellulose, starch, gelatin, casein, polyvinyl pyrrolidone, styrene-maleic anhydride copolymers, polyacrylates, polyacrylic copolymers.

According to the present invention, the aforementioned chromogenic dyestuffs, phenolic substances, inorganic fillers and waxes are dispersed or dissolbed in an aqueous solution containing a water-soluble binder.

In this case, it is preferred that these dispersed particles are ground as minutely as possible and, more specifically, down to a particle size of several microns or smaller by means of a ball mill, attritor or sand grinder.

Waxes and fatty amide type waxes may be used in dispoersion as mentioned above or may be added as an emulsion. As auxiliaries, activators such as dispersing agents or antifoamers may be also added.

The amounts of calcined clay, calcined aluminum oxide and other ingredients to be added in accordance with the present invention are not otherwise limited, but determined depending upon the performance and recording aptitude required for the specific heat-sensitive recording paper product that is used on the particular heat-sensitive recording equipment having specific characteristics. However, in ordinary cases, 3–10 parts of bisphenol A and 5–20 parts of calcined clay or calcined aluminum oxide are used per 1 part of a chromogenic dyestuff. While, it is suitable to add 10–20% by weight of a binder per total solid content.

Hereinafter, the present invention will be described further by way of typical exemplary formulations of the preferred embodiments thereof.

EXAMPLE 1

| | |
|---|---|
| Solution A | |
| 3-diethylamino-6-methyl-7-anilinofluorane | 2.0 parts |
| 10% aqueous solution of polyvinyl alcohol | 4.6 parts |
| water | 2.5 parts |
| Solution B | |
| 4,4-isopropylidene diphenol | 6.0 parts |
| Amide HT (LION AKZO COMPANY., LTD.) | 3.0 parts |
| Zinc stearate | 0.5 part |
| 10% aqueous solution of polyvinyl alcohol | 19.0 parts |
| Water | 19.0 parts |

The solutions A and B were individually attrited into a dispered state by a ball mill for several days. Then, the fillers as shown in Table 1 and 10 parts of 10% aqueous solution of polyvinyl alcohol were added to the solutions A and B, respectively, to prepare heat-sensitive coatings. Thereafter, the resultant coatings were applied by using a meier bar (wirewound bar) on base papers weighing 50 $g/m^2$ at a coating weight of 6 $g/m^2$, respectively. The thus coated papers were dried to obtain heat-sensitive recording papers. The resultant heat-sensitive recording papers were tested for their quality and performance under the conditions as given in Table 1.

TABLE 1

| Fillers (parts) | a | b | c | d | e | f |
|---|---|---|---|---|---|---|
| Mixing Ratio | | | | | | |
| Kaolin clay | 12 | 24 | | | | |
| Calcium Carbonate | | | 24 | | | |
| Calcined clay | | | | 12 | | |
| Calcined aluminum oxide (calcined at 500° C.) | | | | | 12 | |
| Calcined aluminum oxide (calcined at 900° C.) | | | | | | 12 |
| Static image density (150° C.) *(1) | 1.30 | 1.28 | 1.30 | 1.40 | 1.38 | 1.38 |
| Recording aptitude *(2) | | | | | | |
| Dynamic image density (solid) | 1.1 | 0.9 | 0.9 | 1.2 | 1.2 | 1.2 |
| Deposition of residues on thermal head | #4 | #3 | #3 | #1 | #2 | #2 |
| Sticking | #4 | #3 | #2 | #2 | #2 | #2 |
| Smeared print image | #4 | #3 | #3 | #2 | #2 | #2 |

#1 Excellent
#2 Good
#3 Unacceptable
#4 Bad
Notes:
*(1) The heat-sensitive recording papers were pressed down for five seconds under 10g/$cm^2$ against at hot plate heated at 150° C. and the color was measured using a macbeth densitometer RD-104 with an amber filter.
*(2) Heat-sensitive Facsimile Equipment KB-500 manufactured by TOSHIBA ELECTRIC CO., LTD. was used.

As clearly seen from Table 1, the heat-sensitive recording papers (d), (e) and (f) using calcined clay or calcined aluminum oxide according to the present invention can give a far excellent recording aptitude for facsimile with reduced residues deposition, smearing and sticking than other recording papers (a) and (b) using kaolin clay and (c) using calcium carbonate even with a mixing ratio half the mixing ratio of the latter. Further, since the heat-sensitive recording papers (d), (e) and (f) according to the present invention has a high image density, a clear black image can be produced.

EXAMPLE 2

| | |
|---|---|
| Solution A | |
| Crystal violet lactone | 1.5 parts |
| 10% aqueous solution of polyvinyl alcohol | 3.4 parts |
| Water | 1.92 parts |
| Solution B | |

The same as the solution B of Example 1.

The solutions A and B were individually attrited for one hour by means of a testing sand grinder into a dispersion, respectively. Then, predetermined amounts of fillers as shown in Table 2 and 10 parts of 10% aqueous solution of polyvinyl alcohol were added into the solutions A and B, respectively, to prepare heat-sensitive coatings.

In the same manner as Example 1, the resultant coatings were applied with a meier bar onto base papers weighing 50 $g/m^2$ at a coating weight of 6 $g/m^2$, and the thus coated papers were dried to obtain heat-sensitive recording papers.

TABLE 2

| | A | B | C | D | E | F | G | H |
|---|---|---|---|---|---|---|---|---|
| Mixing ratio | | | | | | | | |
| Kaolin clay | 16 | 20 | 24 | 16 | 16 | 0 | 16 | 0 |
| calcined clay | 0 | 0 | 0 | 2 | 4 | 12 | 0 | 0 |
| Calcined aluminum oxide *(1) 0 | 0 | 0 | 0 | 0 | 0 | 4 | 12 | |
| Static image density | 1.36 | 1.35 | 1.32 | 1.37 | 1.37 | 1.45 | 1.36 | 1.43 |
| Recording aptitude | | | | | | | | |
| Facsimile *(2) | | | | | | | | |
| Dynamic image density | 1.24 | 1.16 | 1.10 | 1.20 | 1.18 | 1.20 | 1.18 | 1.20 |
| Residues deposition | #4 | #3 | #2 | #3 | #2 | #2 | #2 | #2 |
| Sticking | #3 | #3 | #3 | #3 | #2 | #2 | #2 | #2 |
| Bleeding | #4 | #3 | #2 | #3 | #2 | #2 | #2 | #2 |
| Printer *(3) | | | | | | | | |
| Residues deposition | #4 | #4 | #2 | #3 | #2 | #2 | #2 | #2 |
| Sticking | #3 | #3 | #3 | #3 | #2 | #2 | #2 | #2 |
| Bleeding | #4 | #3 | #2 | #4 | #2 | #2 | #2 | #2 |

#2 Good
#3 Unacceptable
#4 Bad
Notes:
*(1) oxide calcined at 500° C.
*(2) Heat-sensitive Facsimile Equipment KB-500 manufactured by TOSHIBA ELECTRIC CO., LTD. was used.
*(3) Personal computer model-10 manufactured by Hewlette Packard was used.

The resultant heat-sensitive recording papers were runned on the heat-sensitive facsimile equipment and thermal printer, respectively, to make records thereon. The results of the recording test are also given in Table 2. As clearly seen from Table 2, kaolin clay as added singly cannot bring forth a good recording aptitude unless it is added at least 24 parts, while the recording aptitude can be remarkably improved when a small amount of calcined clay or calcined aluminum oxide is added thereto.

In all cases in which calcined clay or calcined aluminum oxide was added, clear blue images could be recorded without bleeding.

EXAMPLE 3

| | | |
|---|---|---|
| Solution A | | |
| Crystal violet lactone | 0.93 | part |
| 10% aqueous solution of polyvinyl alcohol | 4.06 | parts |
| Water | 1.74 | parts |
| Solution B | | |
| 4,4-isopropylidene diphenol | 6.00 | parts |
| Ethylene-bis-stearamide | 0.31 | part |
| Zinc stearate | 0.31 | part |
| 10% aqueous solution of polyvinyl alcohol | 41.30 | parts |
| Water | 5.83 | parts |

The solutions A and B were individually attrited into a dispersion for three hours by means of an attritor. Then, as shown in Table 3, 3.1 parts of kaolin clay and calcined clay were added into the solutions A and B as a filler, respectively, to prepare heat-sensitive paints. The resultant heat-sensitive coatings were coated with an air-knife coater onto base papers weighing 50 $g/m^2$ at a coating weight of 6 $g/m^2$, and the thus coated papers were dried to obtain heat-sensitive recording papers.

TABLE 3

| | a | b |
|---|---|---|
| Mixing ratio | | |
| Kaolin clay | 3.1 | |
| Calined clay | | 3.1 |
| Static image density | 1.32 | 1.40 |
| Recording aptitude for printer *(1) | | |
| Residues deposition | #4 | #2 |
| Bleeding | #3 | #2 |
| Smearing *(2) | #4 | #2 |

#2 Good
#3 Unacceptable
#4 Bad
Notes:
*(1) Desk Calculator Model-97 manufactured by Hewlett Packard was used.
*(2) Smearing means such a staining of the white base that is caused by deposition of colored substances at places other than where intended images are to be produced, when they are recorded by a heat-sensitive printer.

The resultant heat-sensitive recording papers were runned on the thermal printer to make records thereon. The results of the recording test are also given in Table 3. As clearly seen from Table 3, the heat-sensitive recording papers using calcined clay can produce a clearer blue color with a higher image density than that produced on the heat-sensitive recording papers using ordinary kaolin clay, almost without being accompanied by smearing, bleeding and residues deposition on the thermal head.

EXAMPLE 4

| | |
|---|---|
| Solution A | The same as that of Example 1. |

-continued

| | |
|---|---|
| Solution B | The same as that of Example 1. |

The solutions A and B were individually attrited into dispersion for three hours by using an attritor. Then, 10 parts of calcined clay and 2 parts of calcium carbonate were added as fillers into the solutions A and B, respectively, to prepare heat-sensitive coatings. The resultant coatings were applied with an air-knife coater on base papers weighing 50 $g/m^2$ at a coating weight of 6.5 $g/m^2$, and the thus coated papers were dried to obtain heat-sensitive recording papers.

The resultant heat-sensitive recording papers having a white base color were pressed down under pressure of 10 $g/m^2$ against a hot plate heated at 150° C. As a result of this heating, the recording papers developed a color with an image density of 1.42. When runned on Facsimile Model-100 manufactured by Oki Electric Co., Ltd., they gave clear balck images with a high image density and definite contrast. Further, even when subjected to a continuous recording test, no residue was deposited on the thermal head and, therefore, images recorded after a lapse of a substantially long time from the start of the recording operation were hardly different from those recorded at the start. Also, the images were free from sticking and bleeding and could be produced at a high stability.

What we claim is:

1. A heat-sensitive recording paper having an excellent recording aptitude for thermal recording equipment containing a phenolic substance and one colorless or thin-colored chromogenic dyestuff selected from the group consisting of lactone, lactam and spiropyrane in the color-developing layer, said color-developing layer containing calcined clay or calcined aluminum oxide.

2. A heat-sensitive recording paper according to claim 1, wherein at least 5% by weight of said calcined clay or calcined aluminum oxide is contained in total amount of the fillers thereof.

3. A heat-sensitive recording paper according to claim 1, wherein said color-developing layer further contains at least one substance to be selected from a group comprising calcium carbonate, kaolin and synthetic aluminum silicate, in addition to said calcined clay or said calcined aluminum oxide.

4. A heat-sensitive recording paper according to claim 1, wherein said chromogenic dyestuff is at least one substance to be selected from a group comprising crystal violet lactone, 3-diethyamino-6-methyl-7-chlorofluorane, 3-cyclohexylamino-6-chlorofluorane, 3-diethylamino-7-dibenzylaminofluorane, 3-diethyamino-6-methyl-7-anilinofluorane, and 3-pyrrolidino-6-methyl-7-anilinofluorane.

5. A heat-sensitive recording paper according to claim 1, wherein said phenolic substance is at least one phenolic novolak resin to be selected from a group comprising bisphenol A (4,4-isopropylidenediphenol), p-p' (1-methyl-n-hexylidene) diphenol, p-tert-butylphenol, and p-phenylphenol.

6. A heat-sensitive recording paper according to claim 1, wherein said color-developing layer contains 1 part of colorless or thin-colored chromogenic dyestuff, 3–10 parts of said phenolic substance, 5–20 parts of said calcined clay or calcined aluminum oxide, and 10–20% by weight of a binder per total solid content thereof.

* * * * *